(12) United States Patent
Saitou et al.

(10) Patent No.: US 7,530,282 B2
(45) Date of Patent: May 12, 2009

(54) BALL SCREW APPARATUS

(75) Inventors: Shingo Saitou, Kanagawa (JP); Koji Hashimoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 611 days.

(21) Appl. No.: 11/257,101

(22) Filed: Oct. 25, 2005

(65) Prior Publication Data

US 2007/0137344 A1    Jun. 21, 2007

(51) Int. Cl.
    *F16H 1/18* (2006.01)
(52) U.S. Cl. .................................. 74/424.75; 74/424.85
(58) Field of Classification Search .............. 74/424.85, 74/424.75
    See application file for complete search history.

(56) References Cited

U.S. PATENT DOCUMENTS

| | | | | |
|---|---|---|---|---|
| 3,068,714 A | * | 12/1962 | Davis ....................... | 74/424.85 |
| 7,051,610 B2 | * | 5/2006 | Stoianovici et al. ........... | 74/425 |
| 7,249,533 B2 | * | 7/2007 | Inoue et al. ............... | 74/424.85 |
| 7,305,902 B2 | * | 12/2007 | Inoue et al. ............... | 74/424.85 |
| 2003/0121346 A1 | * | 7/2003 | Watanabe et al. ......... | 74/424.75 |
| 2004/0083840 A1 | * | 5/2004 | King et al. ............... | 74/424.85 |
| 2004/0093973 A1 | * | 5/2004 | Halasy-Wimmer et al. ....................... | 74/424.85 |

FOREIGN PATENT DOCUMENTS

JP        2003-74665 A       3/2003

* cited by examiner

*Primary Examiner*—David M Fenstermacher
(74) *Attorney, Agent, or Firm*—Sughrue Mion, PLLC

(57) ABSTRACT

A ball screw apparatus of a screw shaft circulating-type includes a nut having a first groove formed in an inner peripheral surface thereof, a screw shaft having a second groove formed in an outer peripheral surface thereof, and a plurality of rolling elements provided between the first and second grooves. A circulating groove is formed in the screw shaft so as to interconnect opposite ends in a spiral direction of the second groove of the screw shaft to form a closed-loop ball endless circulating passageway. Processing relief portions for preventing a processing tool of a rotary drive-type from interfering with the circulating groove when processing the second groove of the screw shaft by the processing tool are provided respectively at the opposite end portions in the spiral direction of the second groove of the screw shaft.

1 Claim, 4 Drawing Sheets

BALL SCREW APPARATUS

BACKGROUND OF THE INVENTION

1. Field of the Invention

This invention relates to a ball screw apparatus of a screw shaft circulating-type in which a circulating groove is formed in a screw shaft, and interconnects opposite ends in a spiral direction of a thread groove of the screw shaft to form a closed-loop ball endless circulating passageway.

2. Description of the Background Art

For example, a member which is called "a circulating piece", having a ball circulating groove, has heretofore been used in a ball circulating system for achieving a compact design of a ball screw apparatus by decreasing an outer diameter of a nut.

The circulating piece is fitted in a fitting hole formed in an outer peripheral surface of the nut, and is fixed thereto to form an endless circulating passageway for balls. By a scooping-up portion of the circulating piece, the balls which roll in a load track defined between a thread groove of the nut and a thread groove of a screw shaft, are moved over a land portion of the threaded groove, and are guided into the circulating groove within the circulating piece, and are returned to the adjacent load track between the two thread grooves via the circulating groove.

However, in the ball circulating system employing such a circulating piece, it was necessary to use the externally-mounted part which corresponds to the circulating piece, and besides it was necessary to form the fitting hole for mounting the circulating piece in the nut. Furthermore, a positioning operation for properly positioning connecting portions of the circulating groove and the thread groove with each other when mounting the circulating piece in the fitting hole of the nut was very cumbersome, so that the cost becomes increased.

Under the circumstances, there has been proposed a ball screw apparatus of a screw shaft circulating-type in which a circulating groove is formed in a screw shaft, and interconnects opposite ends in a spiral direction of a thread groove of the screw shaft to form a closed-loop ball endless circulating passageway, thereby achieving the endless circulation of balls with an inexpensive and simple construction without using an externally-mounted part such as a circulating piece (see, for example, Japanese Patent Unexamined Publication JP-A-2003-74665).

However, the following problem is encountered in the case where the circulating groove is directly formed in the screw shaft without using the circulating piece as in the ball screw apparatus of the screw shaft circulating-type disclosed in the JP-A-2003-74665. Namely, a tool which is driven for rotation so as to process the thread groove, such as a cutting tool and a grinding stone, is needed to be reduced in diameter size so that the tool will not interfere with the circulating groove. More specifically, when the thread groove is processed in a direction of arrow D (FIG. 7), using the rotary tool with a large diameter, there is a fear that the rotary tool interferes with a portion C of the screw shaft, and the rotary tool processes or machines this portion C. In contrast, when the feeding of the rotary tool in the direction of arrow D is stopped at a region short of the circulating groove so that the portion C will not be processed by the rotary tool, a portion B of the screw shaft is not properly processed. Therefore, it was necessary to reduce the diameter of the rotary tool so that the portion C would not be processed, while the portion B could be positively processed. Therefore, the efficiency of processing the screw shaft was lowered, and this prevented the production cost from being reduced.

SUMMARY OF THE INVENTION

This invention has been made in order to overcome the above disadvantage, and an object of the invention is to provide a ball screw apparatus of a screw shaft circulating-type in which a thread groove can be processed in a screw shaft by the use of a processing tool larger in diameter than a processing tool used for the conventional screw shaft, thereby enhancing the processing efficiency, thus enabling the reduction of the production cost.

According to a first aspect of the present invention, there is provided a ball screw apparatus of a screw shaft circulating-type comprising:

a nut having a first groove formed in an inner peripheral surface thereof;

a screw shaft having a second groove formed in an outer peripheral surface thereof; and a plurality of rolling elements disposed between the first and second grooves;

wherein a circulating groove is formed in the screw shaft so as to interconnect opposite ends in a spiral direction of the second groove of the screw shaft to form a closed-loop ball endless circulating passageway; and wherein processing relief portions for preventing a processing tool of a rotary drive-type from interfering with the circulating groove when processing the second groove of the screw shaft by the processing tool are provided respectively at the opposite end portions in the spiral direction of the second groove of the screw shaft.

Further, according to a second aspect of the present invention, as set forth in the first aspect of the present invention, it is preferable that a depth of a groove of the processing relief portion, is deeper than a depth of the second groove, and is shallower than a depth of the circulating groove.

According to the present invention, the processing relief portions for preventing the processing tool from interfering with the circulating groove when processing the second groove of the screw shaft by the processing tool, which is driven for rotation, are provided respectively at the opposite end portions in the spiral direction of the second groove of the screw shaft. Therefore, the thread groove in the screw shaft can be processed by the use of the processing tool of the larger diameter, and therefore the highly-efficient processing can be carried out, so that the production cost can be reduced.

DETAILED DESCRIPTION OF THE PREFERRED EMBODIMENTS

Figure 1:
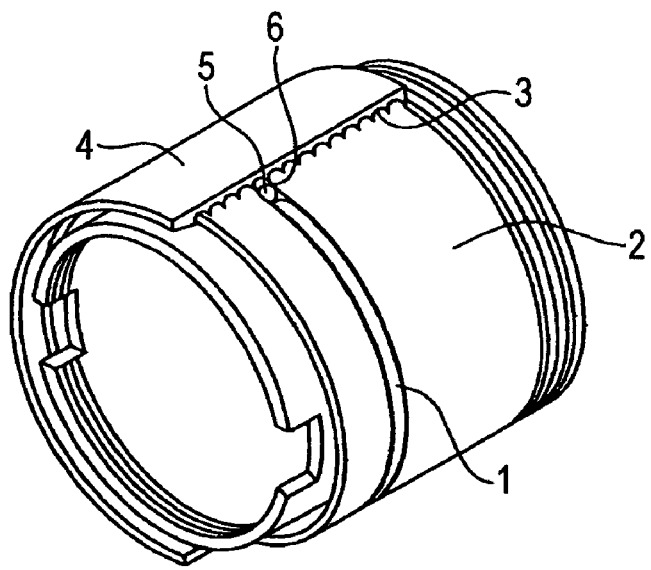
FIG. 1 is a partly-cutout, perspective view showing one preferred embodiment of a screw shaft circulating-type ball screw apparatus of the present invention.
Figure 4:
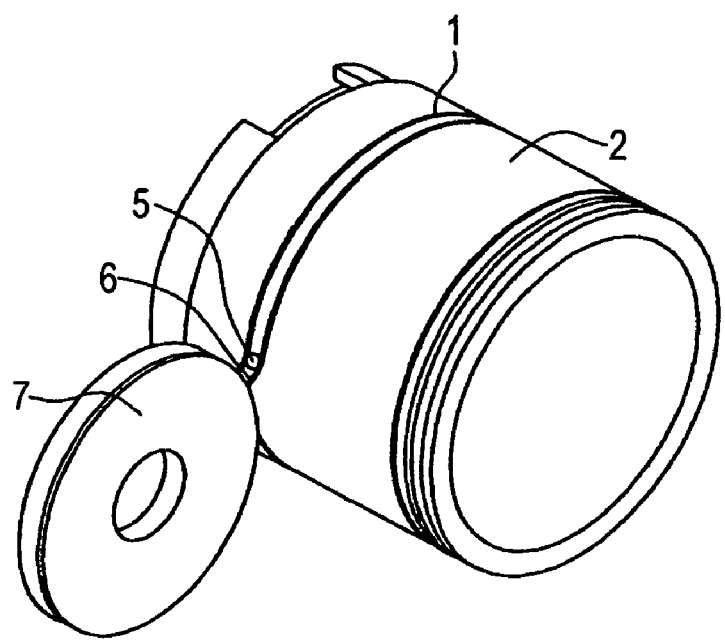
FIG. 4 is a perspective view explanatory of the processing of a thread groove in the screw shaft by a rotary grinding stone.
Figure 5:
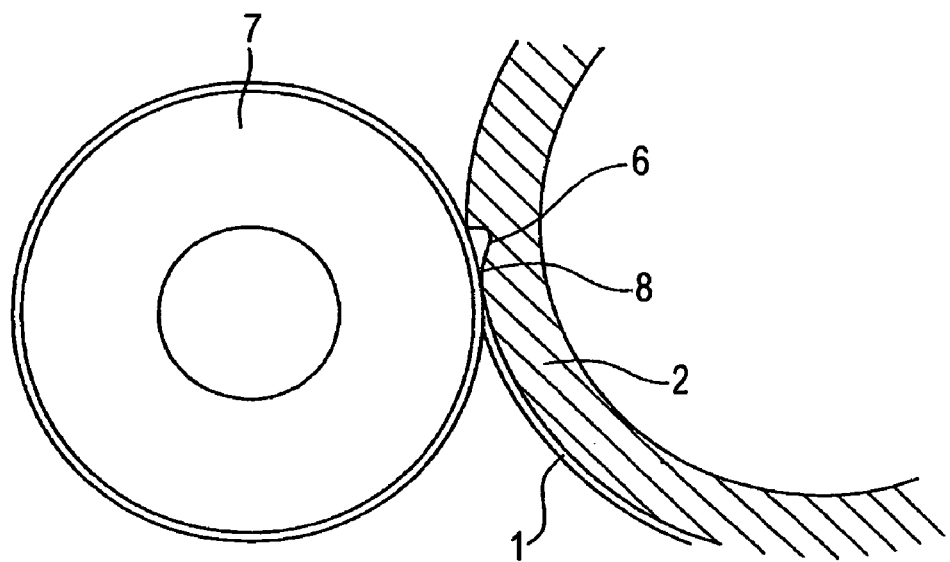
FIG. 5 is a cross-sectional view showing the positional relation between the rotary grinding stone and a processing relief portion at an end of the thread groove in the screw shaft.
Figure 6:
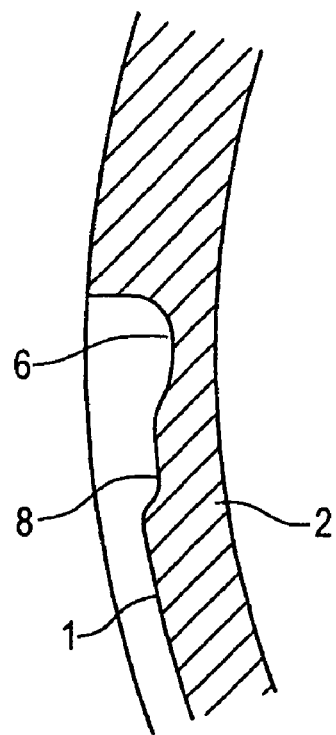
FIG. 6 is a cross-sectional view taken along the line A-A of FIG. 3.
Figure 7:
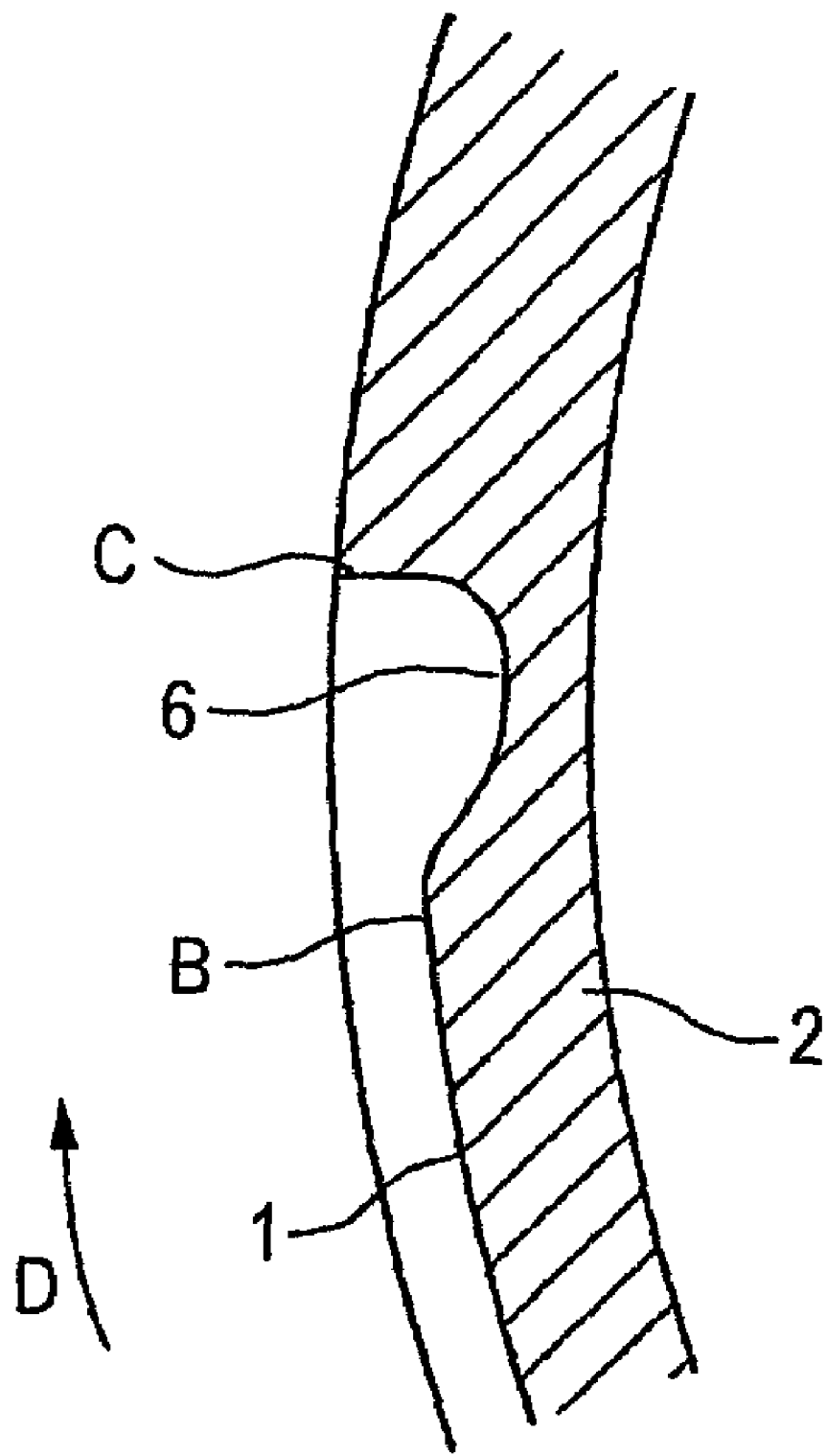
FIG. 7 is a cross-sectional view similar to FIG. 6, but showing an end portion of a thread groove in a conventional screw shaft.

One preferred embodiment of the present invention will now be described with reference to the drawings. FIG. 1 is a partly-broken, perspective view showing one preferred embodiment of a ball screw apparatus of the screw shaft circulating-type, FIG. 2 is a cross-sectional view of an essential portion of FIG. 1 in an axial direction, FIG. 3 is a view showing an essential portion of a screw shaft, FIG. 4 is a perspective view explanatory of the processing of a thread groove in the screw shaft by a rotary grinding stone, FIG. 5 is a cross-sectional view showing the positional relation between the rotary grinding stone and a processing relief portion at an end of the thread groove in the screw shaft, FIG. 6 is a cross-sectional view taken along the line A-A of FIG. 3, and FIG. 7 is a cross-sectional view similar to FIG. 6, but showing an end portion of a thread groove in a conventional screw shaft.

Figure 2:
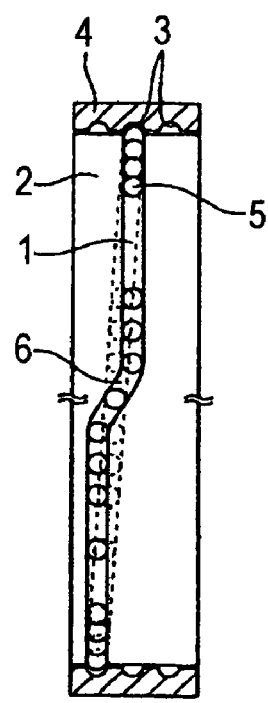
FIG. 2 is a cross-sectional view of an essential portion of FIG. 1 in an axial direction.
Figure 3:
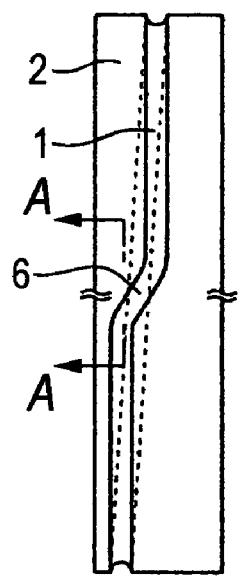
FIG. 3 is a view showing an essential portion of a screw shaft.

As shown in FIGS. 1 to 3, the screw shaft circulating-type ball screw apparatus of this embodiment is formed into a hollow shape in order to achieve a lightweight design. The spiral thread groove 1 of a single turn is formed in an outer peripheral surface of the screw shaft 2, and a spiral thread groove 3, corresponding to the thread groove 1, is formed continuously in an inner peripheral surface of a nut 4, with its turns arranged in an axial direction. The nut 4 is threaded on the screw shaft 2.

The thread groove 3 of the nut 4 and the thread groove 1 of the screw shaft 2 are opposed to each other to form a spiral load area therebetween. A number of balls as rolling elements 5 are provided in this load area so as to roll therein.

A circulating groove 6 is formed in the screw shaft 2, and interconnects opposite ends in a spiral direction of the thread groove 1 of the screw shaft 2 to form a close-loop ball endless circulating passageway. With this construction, the balls 5, rolling in a load track between the thread groove 3 of the nut 4 and the thread groove 1 of the screw shaft 2, are guided into the circulating groove 6, and are displaced generally radially inwardly of the screw shaft 2 to move over a land portion of the nut 4, and then are returned to the adjacent load track between the two thread grooves 1 and 3 via the circulating groove 6. Here, the term "the land portion of the nut 4" means the inner peripheral surface portion of the nut 4 defined between any two adjacent turns of the thread groove 3 of the nut 4.

In this embodiment, the processing relief portions 8 are provided respectively at the opposite end portions in the spiral direction of the thread groove 1 of the screw shaft 2 and the processing relief portions 8 prevent the rotary grinding stone 7 (or a rotary cutting tool or the like) from interfering with that portion of the circulating groove 6 (corresponding to the portion B of FIG. 7 of the conventional circulating groove interfering with the processing tool) as shown in FIGS. 5 and 6 when processing the thread groove 1 of the screw shaft 2 by the rotary grinding stone 7 as shown in FIG. 4. With this construction, the processing of the thread groove 1 in the screw shaft 2 can be effected by the use of the rotary grinding stone 7 (or the rotary cutting tool or the like) larger in diameter than the rotary grinding stone used for the conventional screw shaft. Namely, even if the feeding of the rotary tool 7 in the direction of arrow D is stopped at a region short of the circulating groove 6 during the processing of the thread groove 1 of the screw shaft 2 by the use of the rotary tool 7 of the larger diameter so that the portion C (in FIG. 7) will not be processed by the rotary tool 7, the portion to be processed will not remain unprocessed since the processing relief portion 8 is beforehand formed in this portion of the screw shaft 2.

As described above, in this embodiment, the processing relief portions 8 for preventing the rotary grinding stone 7 (or the rotary cutting tool or the like) from interfering with the circulating groove 6 are provided respectively at the opposite end portions in the spiral direction of the thread groove 1 of the screw shaft 2, and with this construction the processing of the thread groove 1 in the screw shaft 2 can be effected by the use of the rotary grinding stone 7 (or the rotary cutting tool or the like) larger in diameter than the rotary grinding stone used for the conventional screw shaft. Therefore, the highly-efficient processing can be carried out, so that the production cost can be reduced. And besides, if the rotary grinding stone (or the rotary cutting tool or the like) 7 should fail to be stopped accurately at the proper processing-finish position, the interference of the rotary grinding stone 7 with the circulating groove 6 can be avoided.

The present invention is not limited to the above embodiment, and suitable modifications and changes can be made without departing from the subject matter of the invention.

For example, in the above embodiment, although the thread groove 1 of the single turn is formed in the outer peripheral surface of the screw shaft 2, the present invention is not limited to this construction, but can be applied also to the case where there are provided a plurality of rows of single-turn thread grooves 1 each having opposite ends in the spiral direction communicating with each other via a circulating groove 6 so as to form a closed-loop ball endless circulating passageway.

While the preferred embodiments of the present invention have been described, it will be obvious to those skilled in the art that various changes and modifications may be made therein without departing from the present invention, and it is aimed, therefore, to cover in the appended claims all such changes and modifications as fall within the true spirit and scope of the present invention.

What is claimed is:

1. A ball screw apparatus of a screw shaft circulating-type comprising:
   a nut having a first groove on an inner peripheral surface thereof;
   a screw shaft having a second groove on an outer peripheral surface thereof; and
   a plurality of rolling elements provided between the first and second grooves;
   wherein a circulating groove, which connects both ends of the second groove so as to infinitely circulate the rolling element is provided on the screw shaft,
   a relief portion is provided on an area at which the circulating groove connects with the second groove, and
   a groove width of the relief portion is smaller than a width of the circulating groove and is larger than a width of the second groove.

* * * * *